United States Patent
Ho

(10) Patent No.: US 8,156,593 B2
(45) Date of Patent: Apr. 17, 2012

(54) METHOD FOR MAKING GOODYEAR SHOE

(75) Inventor: Shu Tzu Ho, Taipei (TW)

(73) Assignee: Golden Chang Industrial Co., Ltd., San Chung, Taipei (TW)

( * ) Notice: Subject to any disclaimer, the term of this patent is extended or adjusted under 35 U.S.C. 154(b) by 421 days.

(21) Appl. No.: 12/476,255

(22) Filed: Jun. 1, 2009

(65) Prior Publication Data

US 2010/0299850 A1 Dec. 2, 2010

(51) Int. Cl.
*A43B 9/04* (2006.01)
*A43D 9/00* (2006.01)

(52) U.S. Cl. ............ 12/142 D; 36/17 R; 36/17 PW

(58) Field of Classification Search ........... 36/14, 17 R, 36/17 A, 17 PW, 21; 12/142 D, 142 F, 142 RS, 12/142 T, 142 R
See application file for complete search history.

(56) References Cited

U.S. PATENT DOCUMENTS

| | | | | |
|---|---|---|---|---|
| 3,174,170 A | * | 3/1965 | Verreault et al. | 12/32 |
| 4,599,810 A | * | 7/1986 | Sacre | 36/55 |
| 5,768,801 A | * | 6/1998 | Huff | 36/17 R |
| 5,911,491 A | * | 6/1999 | Huff | 36/17 R |
| 6,637,131 B2 | * | 10/2003 | Lee | 36/17 R |
| 7,007,411 B2 | * | 3/2006 | Davis | 36/107 |
| 7,644,519 B2 | * | 1/2010 | Su | 36/30 R |
| 7,836,609 B2 | * | 11/2010 | Covatch | 36/17 R |
| 2005/0138846 A1 | * | 6/2005 | O'Connor | 36/72 B |
| 2010/0175527 A1 | * | 7/2010 | Nishimura et al. | 83/167 |

* cited by examiner

*Primary Examiner* — Jila Mohandesi
(74) *Attorney, Agent, or Firm* — Muncy, Geissler, Olds & Lowe, PLLC

(57) ABSTRACT

A method for making a Goodyear shoe includes the steps of: stitching together a lower edge of an upper and a peripheral edge of an inner midsole so as to form a coupled section; placing a last into an assembly resulting from the previous step; placing an outer welt on an outer surface of the upper at the coupled section and stitching the outer welt, the upper, and the inner midsole together; placing a filler on a bottom surface of the inner midsole; bonding a thin sole to a bottom portion of an assembly that results from the previous step and stitching the thin sole to the outer welt; and bonding an outsole and performing edge-abrading. The method prevents a toe cap portion of the upper from tearing and creasing and dispenses with such steps as gripping the upper, driving wire nails, and trimming the lower edge of the upper.

7 Claims, 2 Drawing Sheets

METHOD FOR MAKING GOODYEAR SHOE

BACKGROUND OF THE INVENTION

1. Technical Field

The present invention relates to methods for making a Goodyear shoe. More particularly, the present invention relates to a method for making a Goodyear shoe, wherein a lower edge of an upper is directly stitched to an inner midsole so as to dispense with such conventional steps as gripping the upper, driving wire nails, and trimming off an excess of the lower edge of the upper.

2. Description of Related Art

Work shoes made and stitched by the Goodyear process are called Goodyear shoes. These shoes, strong and durable, are suitable for use in factories as well as for hunting, firefighting, military actions, etc. where strict safety protection is required.

Please refer to FIG. 1A through FIG. 1D for a conventional manufacturing process of a Goodyear shoe, wherein the manufacturing process (hereinafter referred to as the gripping and wrapping method) includes the steps of: a) placing an inner midsole 11 on a bottom portion of a last 12; b) gripping a lower edge 14 of an upper 13 with lasting pincers 15, wrapping the lower edge 14 of the upper 13 around the last 12, and bonding the lower edge 14 of the upper 13 to an outer surface of an inner welt 16 formed at a lower edge of the inner midsole 11, using hot glue injected from the lasting pincers 15, as shown in FIG. 1A; c) fastening a connected portion between the lower edge 14 of the upper 13 and the inner welt 16 of the inner midsole 11 with a wire nail 17, as shown in FIG. 1B; d) placing an outer welt 18 on an outer surface of the upper 13 and stitching the outer welt 18, the upper 13, and the inner midsole 11 together; e) trimming off a gripped section 19 of the lower edge 14 of the upper 13 so that the lower edge 14 of the upper 13 is flush with a lower edge of the inner welt 16 of the inner midsole 11, as shown in FIG. 1C; f) placing a filler 21 in a recess that is formed on a bottom surface of the inner midsole 11 and surrounded by the inner welt 16, then bonding a thin sole 22 to a bottom portion of the assembly of the filler 21, the upper 13, and the inner midsole 11, and stitching the thin sole 22 to the outer welt 18; and g) bonding an outsole 23, as shown in FIG. 1D, and performing edge-abrading.

The manufacturing process described above, though capable of producing Goodyear shoes with the desired functions, is defective in many ways. Firstly, when the upper is gripped by the lasting pincers and wrapped around the last, a toe cap portion of the upper tends to tear and crease. As a result, the product yield is lowered, and the shoe shape esthetically impaired. Secondly, while a portion of the lower edge of the upper must be set aside as the gripped section to be gripped by the lasting pincers, it is also required that the gripped section be trimmed off before the thin sole is bonded. Thus, material costs increase as the leather material for use as the upper is wasted. Thirdly, in order to sustain the wrapping of the upper and be stitched with the outer welt, the inner midsole must be made of a material which is less likely to twist and deform, such as plastic, and the inner midsole must be formed with the inner welt. Hence, the sole of the resultant Goodyear shoe tends to be so stiff as to prevent comfort of walking.

BRIEF SUMMARY OF THE INVENTION

In view of the aforesaid defects of the conventional manufacturing process of Goodyear shoes, the present invention proposes a novel method for making a Goodyear shoe, wherein the method is intended to prevent the toe cap portion of the upper of a Goodyear shoe from tearing and creasing which may otherwise occur if the conventional gripping and wrapping method is used; to reduce the wasteful use, and therefore cost, of material that may otherwise result from reservation of the gripped section at the lower edge of the upper for use by the lasting pincers; and to alleviate the discomfort of walking that is otherwise attributable to the excessively hard material of which the inner midsole is made.

To achieve the foregoing objectives, the present invention provides a method for making a Goodyear shoe, wherein the method includes the steps of: stitching together a lower edge of an upper and a peripheral edge of an inner midsole so as to form a coupled section; placing a last into an assembly that results from the previous step and includes the upper and the inner midsole; placing an outer welt on an outer surface of the upper at the coupled section and stitching the outer welt, the upper, and the inner midsole together; placing a filler on a bottom surface of the inner midsole; bonding a thin sole to a bottom portion of an assembly that results from the previous step and includes the filler, the upper, and the inner midsole and stitching the thin sole to the outer welt; and bonding an outsole and performing edge-abrading.

In the aforesaid method for making a Goodyear shoe, the part of the coupled section that belongs to the inner midsole is formed by bending a section of the inner midsole downward, such that a recess is also formed on the bottom surface of the inner midsole. The downwardly bent section functions as the inner welt formed at the bottom portion of the conventional inner midsole while the recess surrounded by the downwardly bent section serves to receive the filler. Therefore, the downwardly bent section of the inner midsole is preferably 3 to 5 mm in length.

According to the aforesaid method for making a Goodyear shoe, when the coupled section is formed, the inner midsole forms an equivalent of the inner welt at the bottom portion of the conventional inner midsole. The inner midsole of the present invention is a planar plate and can be made of a material such as leather, fabric, and cardboard which are softer than that of the conventional inner midsole. As a result, the Goodyear shoe made by the method of the present invention not only is more flexible than one made by the conventional gripping and wrapping method but also provides enhanced comfort of walking.

According to the aforesaid method for making a Goodyear shoe, the lower edge of the upper is directly stitched to the inner midsole such that a toe cap portion of the upper will not be torn or wrinkle as is otherwise possible with the conventional gripping and wrapping method. Consequently, Goodyear shoes made by the method of the present invention have higher product yield and are esthetically more desirable than those made by the conventional gripping and wrapping method.

According to the aforesaid method for making a Goodyear shoe, the lower edge of the upper is directly stitched to the inner midsole such that reservation of a gripped section is no more required. Hence, the method of the present invention makes more economic use of the upper material and incurs lower material costs than the conventional gripping and wrapping method.

According to the aforesaid method for making a Goodyear shoe, the lower edge of the upper is directly stitched to the inner midsole so as to eliminate such steps of the conventional gripping and wrapping method as gripping the upper, driving wire nails, and trimming off the gripped section of the upper. Thus, the method of the present invention reduces the time and costs of production.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Figure 1A:
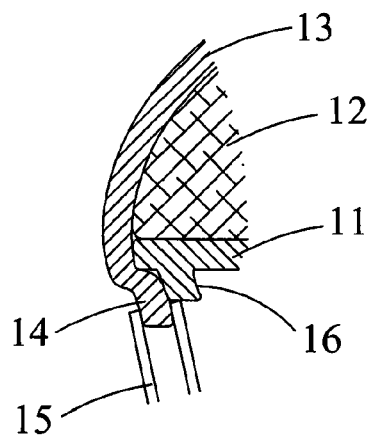
FIG. 1A to FIG. 1D show partial sectional views of a Goodyear shoe at different stages of a conventional manufacturing process.
Figure 1B:
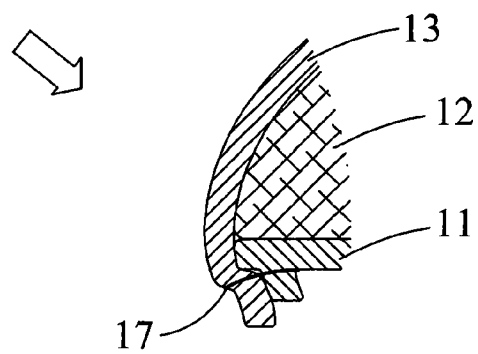
Figure 1C:
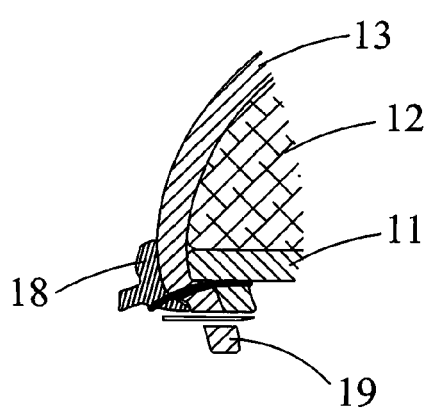
Figure 1D:
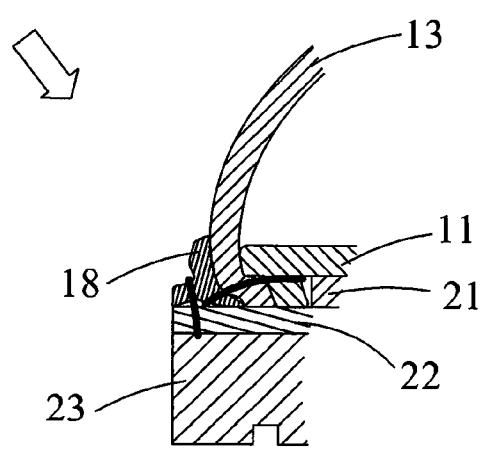
Figure 2A:
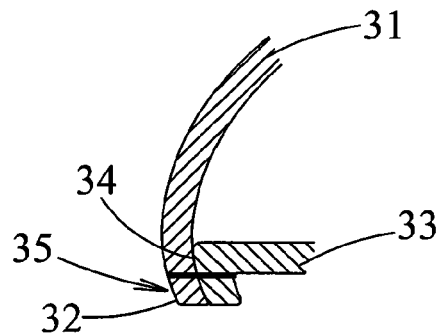
FIG. 2A to FIG. 2C show partial sectional views of a Goodyear shoe at different stages of a manufacturing process provide by the present invention.
Figure 2B:
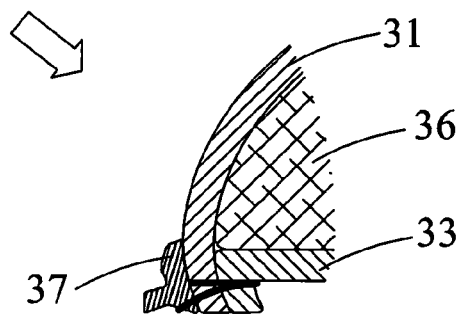
Figure 2C:
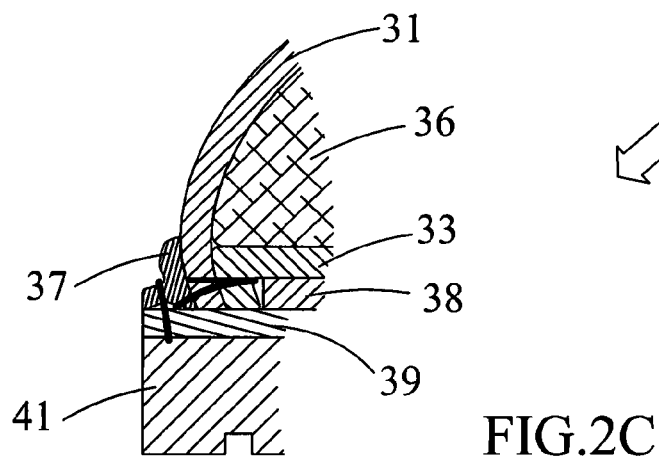

Referring to FIG. 2A to FIG. 2C, a method for making a Goodyear shoe according to a preferred embodiment of the present invention includes the steps of: stitching together a lower edge 32 of an upper 31 and a peripheral edge 34 of an inner midsole 33 so as to form a coupled section 35; placing a last 36 into an assembly that results from the previous step and includes the upper 31 and the inner midsole 33; placing an outer welt 37 on an outer surface of the upper 31 at the coupled section 35 and stitching the outer welt 37, the upper 31, and the inner midsole 33 together; placing a filler 38 on a bottom surface of the inner midsole 33; bonding a thin sole 39 to a bottom portion of an assembly that results from the previous step and includes the filler 38, the upper 31, and the inner midsole 33 and stitching the thin sole 39 to the outer welt 37; and bonding an outsole 41 and performing edge-abrading.

Figure 3:
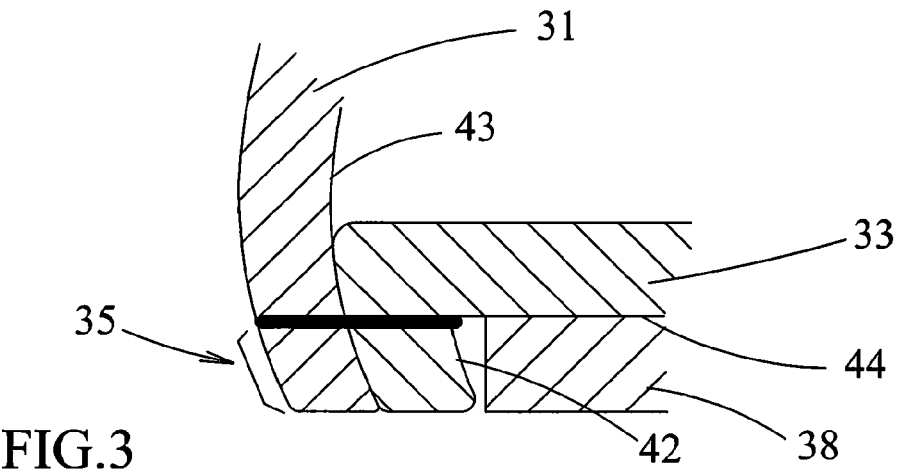
FIG. 3 is a detailed sectional view showing how a lower edge of an upper is stitched to a peripheral edge of an inner midsole according to the present invention.

FIG. 3 shows how the lower edge 32 of the upper 31 is stitched to the peripheral edge 34 of the inner midsole 33. As shown in FIG. 3, a section 42 of the inner midsole 33 is bent downward and then bonded and stitched to an inner lateral surface 43 of the lower edge 32 of the upper 31. By doing so, the bond between the upper 31 and the inner midsole 33 is increased, which is highly desirable in making a Goodyear shoe. The downwardly bent section 42 of the inner midsole 33 and the lower edge 32 of the upper 31 are stitched together to form the coupled section 35. Meanwhile, the downwardly bent section 42 surroundinly defines a recess 44 on the bottom surface of the inner midsole 33 for receiving the filler 38. Thus, the downwardly bent section 42 functions as the inner welt formed on a conventional plastic inner midsole. In order to serve this function, the downwardly bent section 42 of the inner midsole 33 has a length of 3 to 5 mm, which is the thickness of a common filler.

In the method for making a Goodyear shoe according to the present invention, the inner midsole 33 is a planar plate and is preferably made of a pliable material such as leather, fabric, and cardboard so as to form the downwardly bent section 42. However, as would be understood by a person of ordinary skill in the art, the inner midsole 33 must be a plate having an appropriate thickness at least equal to the thickness of a conventional inner midsole such that, after the upper 31 is stitched to the peripheral edge 34 of the inner midsole 33, a correct shoe shape is formed without deformation.

In the method for making a Goodyear shoe according to the present invention, the lower edge 32 of the upper 31 and the peripheral edge 34 of the inner midsole 33 are stitched together before the last 36 is inserted into the assembly of the upper 31 and the inner midsole 33. Consequently, certain steps of the conventional gripping and wrapping method such as gripping the upper, driving wire nails, and trimming off the gripped section of the upper are dispensed with to reduce the time and costs (including material costs) of production while maintaining the functionality of the finished Goodyear shoe.

The embodiment described above is intended only to demonstrate the preferred mode of implementation of the present invention and is not to limit the scope of patent protection, if granted, of the present invention. A person skilled in the art and having read the foregoing technical content of this application may alter or modify the embodiment disclosed herein without departing from the concept of the present invention. Therefore, the scope of the present invention is defined only by the appended claims.

What is claimed is:

1. A method for making a Goodyear shoe, comprising steps of:
    stitching together a lower edge of an upper and a peripheral edge of an inner midsole with a first stitching so as to form a coupled section;
    placing a last into an assembly that results from the previous step and includes the upper and the inner midsole;
    placing an outer welt on an outer surface of the upper at the coupled section and stitching the outer welt, the upper, and the inner midsole together with a second stitching different from said first stitching;
    placing a filler on a bottom surface of the inner midsole;
    bonding a thin sole to a bottom portion of an assembly that results from the previous step and includes the filler, the upper, and the inner midsole and stitching the thin sole to the outer welt; and
    bonding an outsole and performing edge-abrading.

2. The method of claim 1, wherein a section of the inner midsole is bent downward so as to form part of the coupled section, and the downwardly bent section of the inner midsole forms a recess on the bottom surface of the inner midsole for receiving the filler.

3. The method of claim 2, wherein the downwardly bent section of the inner midsole is 3 to 5 mm in length.

4. The method of claim 1, wherein the inner midsole is a planar plate.

5. The method of claim 4, wherein the inner midsole is the planar plate made of a material selected from the group consisting of leather, fabric, and cardboard.

6. The method of claim 1, wherein the lower edge of the upper is flush with the peripheral edge of the inner midsole when stitching to form the coupled section.

7. The method of claim 1 where the first stitching extends only through the upper and the inner midsole.

* * * * *